United States Patent Office 3,510,434
Patented May 5, 1970

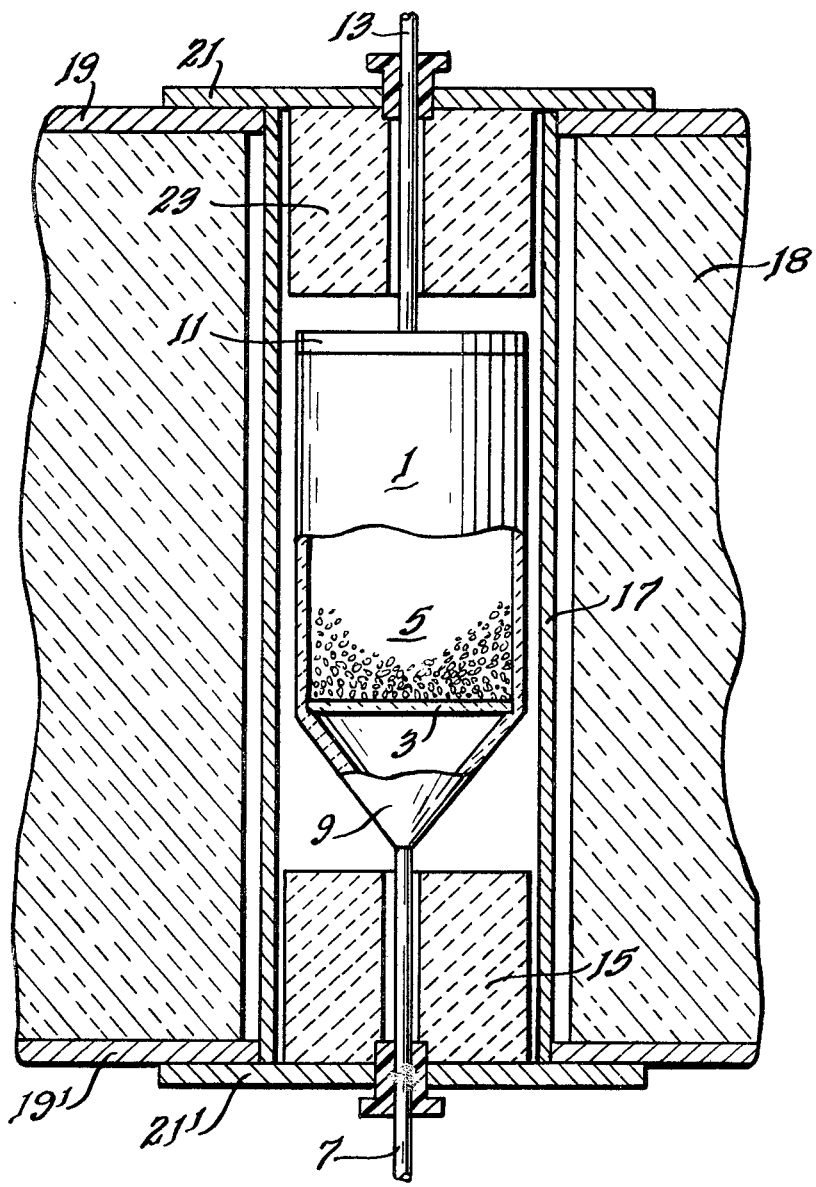

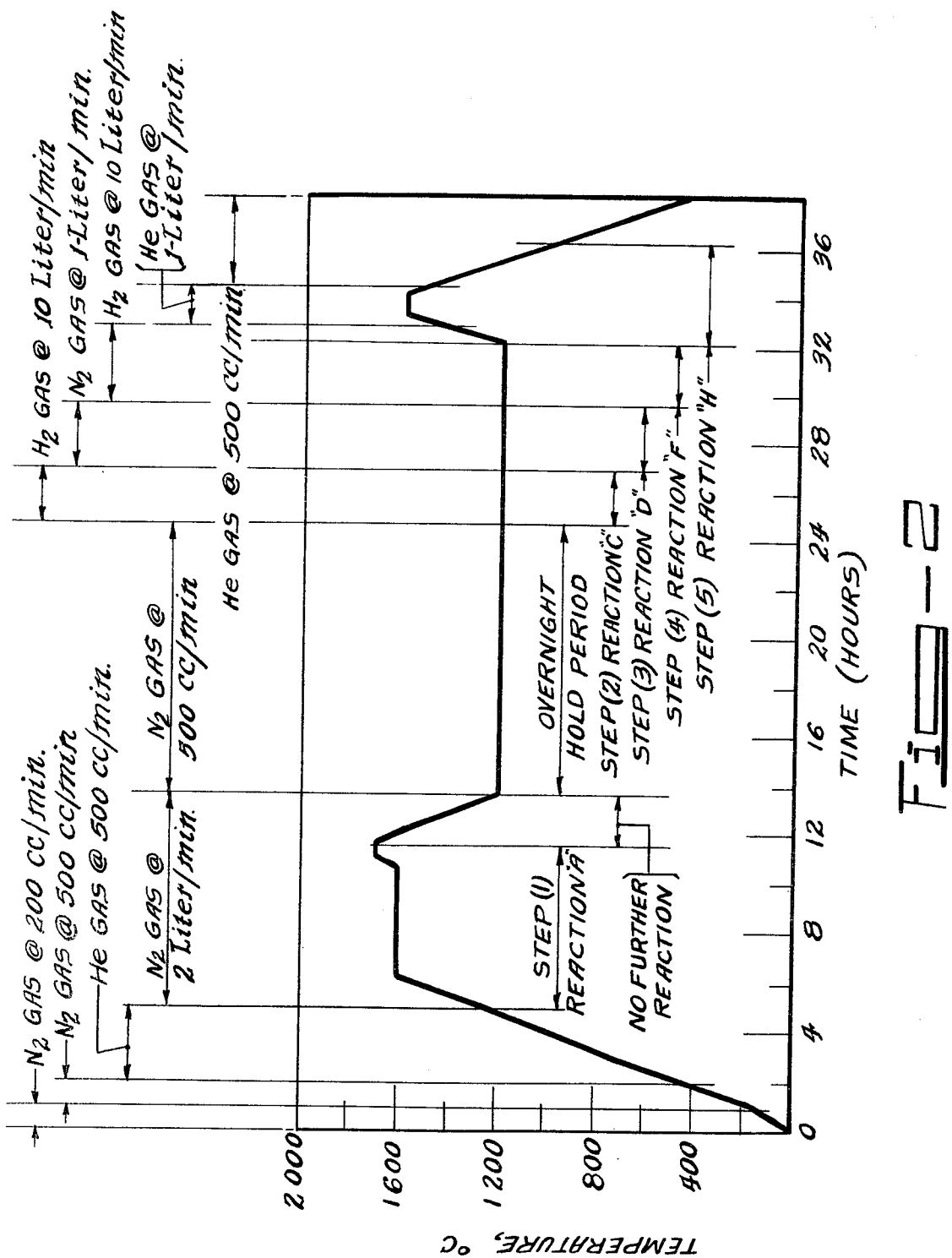

3,510,434
METHOD OF PREPARING A NITRIDE NUCLEAR REACTOR FUEL
Edward T. Weber, Kennewick, and Wilbur O. Greenhalgh, Richland, Wash., assignors to the United States of America as represented by the United States Atomic Energy Commission
Filed June 6, 1968, Ser. No. 735,141
Int. Cl. C09k 3/00; C01g 43/00
U.S. Cl. 252—301.1          8 Claims

ABSTRACT OF THE DISCLOSURE

A process is disclosed for preparing single-phase particles of uranium nitride, plutonium nitride or uranium-plutonium nitride. Very finely divided uranium oxide, plutonium oxide, or a mixture of the two is intimately mixed with finely divided carbon. The mixture is then reacted with flowing nitrogen at a temperature in the range 1500° to 1700° C., until evolution of carbon monoxide ceases, in a reactor made of a refractory material, e.g., tungsten, which is inert to the reactants. The product is then purified by heating with hydrogen at 1000° C. to 1200° C. to remove free carbon, heating with nitrogen at 1000° C. to 1200° C. to displace combined carbon from any carbides or carbonitrides, again heating with hydrogen to remove the carbon thus freed, and heating with an inert gas at a temperature of at least 1500° C. to decompose any higher nitrides, e.g., $U_2N_3$, which have been formed. The material is then cooled in a flow of inert gas. The uranium-plutonium nitrides are particularly desirable as fast reactor fuels.

CONTRACTUAL ORIGIN OF THE INVENTION

This invention was made in the course of or under a contract with the United States Atomic Energy Commission.

BACKGROUND

The mononitrides of uranium and plutonium are dense, refractory compounds of high thermal conductivity, with favorable combinations of physical and neutronic properties which make them of great interest as nuclear reactor fuels. For fast reactors, a homogeneous mixture of plutonium and uranium mononitrides, approximating as closely as possible a true mixed nitride, is highly desirable. Such homogeneous mixed nitrides have generally been prepared by reaction of the metals or hydrides with nitrogen or ammonia followed by interdiffusion of the nitrides by pressing and extended heat treatment. A slightly inhomogeneous uranium-plutonium nitride, somewhat contaminated by carbon was observed as a direct result of carbon-nitrogen reduction of mixed plutonium and uranium oxides (see U.S. Atomic Energy Commission Report BNWL-198, page 1.4).

The production of uranium mononitrides (UN) by the reaction of uranium oxide, carbon, and nitrogen has been tried by several investigators. This reaction may be represented as follows:

$$UO_2 + 2C + \tfrac{1}{2}N_2 \rightarrow UN + 2CO$$

The reaction of plutonium dioxide $PuO_2$, proceeds in the same manner. In practice it has been found that carbon is present as an impurity in the nitride, as the free carbon, carbide, or both. Some effort has been made to avoid the excess carbon by including hydrogen or ammonia in the reaction mixture or to remove the carbon by treatment of the nitride product with hydrogen. To the best of our knowledge, these prior attempts have not given satisfactory results.

SUMMARY OF THE INVENTION

By our process, we produce single-phase particles of uranium nitride (UN), plutonium nitride (PuN) or uranium-plutonium nitride ($Pu_xU_yN$, where $x+y=1$). This is accomplished by the following steps:

(a) Preparing an intimate mixture of very finely divided carbon with a very finely divided uranium oxide, e.g., $UO_2$, a plutonium oxide, e.g., $PuO_2$, or both (in the last-named case the molar ratio of $UO_2$ to $PuO_2$ corresponds to the ratio of $x$ to $y$ in the desired compound $U_xPu_yN$. The carbon constitutes at least 8.6% by weight of the mixture, when the dioxides are utilized);

(b) Passing nitrogen through said reaction mixture at a temperature in the range 1500° C. to 1700° C. until evolution of carbon monoxide ceases;

(c) Passing hydrogen through said reaction mixture at a temperature in the range 1000° C. to 1200° C. until the evolution of methane ceases;

(d) Passing nitrogen through said reaction mixture at a temperature in the range 1000° C. to 1200° C;

(e) Passing hydrogen through said reaction mixture at a temperature in the range 1000° C. to 1200° C. through said reaction mixture until evolution of methane ceases;

(f) Passing an inert gas through said reaction mixture at a temperature of at least 1500° C.; and (g) Cooling said mixture while continuing the passage of inert gas therethrough.

Steps (b)–(g), above, are carried out in a heated chemical reactor made of a refractory metal, e.g., tungsten, in which the solid reactants are supported as a bed on a perforated plate through which the gaseous reactants are passed.

DESCRIPTION OF DRAWING

FIG. 1 shows diagrammatically a vertical section of the chemical reactor employed in our process.

FIG. 2 is a chart of a specific embodiment of our process showing the temepratures and gas flows.

DETAILED DESCRIPTION

(I) Feed preparation

Finely divided uranium dioxide $UO_2$, plutonium dioxide, $PuO_2$, or both, are mixed with finely divided carbon. The carbon should constitute at least 8.6 percent by weight of the mixture, but should not exceed 10% to minimize purification problems. The plutonium oxide and uranium oxide may be present in any proportions desired. In a fast reactor fuel at least 10% of the U and Pu atoms will be fissionable isotopes ($U^{233}$, $U^{235}$, $Pu^{239}$ and $Pu^{241}$). A typical mixture for producing a fast reactor fuel will contain natural or depleted uranium as $UO_2$ and plutonium, predominantly $Pu^{239}$, as $PuO_2$ in the ratio by weight (essentially the same as the molecular ratio) of 4:1. However, the ratio may range from about 10:1 to about 1:1 for a feed suitable for fast breeder reactors.

The mixture of oxides and carbon is ground together in a ball mill for an extended period of time, forming an intimately mixed impalpable powder, having a particle size of less than 25 microns. The mixture, preferably after the addition of a small amount of a waxy binder, is pelleted by cold pressing. The pellets are crushed or otherwise disintegrated and screened to give granules of the desired size, e.g., 10 to 25 mils (250 to 625 microns), each of which contains the mixed solid reactants.

(II) Reaction

The chemical reactor employed is shown in FIG. 1. It comprises a cylindrical chamber 1 made of a refractory material which is inert to the reactants. We have found tungsten to be a desirable material of construction. The reactor contains a plate 3 also of tungsten which supports a bed 5 of solid reactants. Plate 3 is porous, being pierced by numerous holes of such a size as to support the solids but permit the passage of gas. A gas inlet tube 7 communicates with a conical distributor portion 9. A removable cap 11 carries a gas outlet tube 13 which connects to gas analysis apparatus (not shown).

The chamber 1 is supported above a graphite hearth 15 within a graphite resistance heater 17 which is surrounded by a body of insulation 18.

Heater 17 is a cylinder which is in electrical contact with copper end plates 19, 19' which are part of the electrical supply system. Covers 21, 21' seal the furnace, and upper cover 21 carries a graphite plug 23 which provides insulation.

The reactor is brought up to temperature while purging with nitrogen and helium. The following reactions are then carried out. (In the production of the mixed nitrides a 4:1 ratio of uranium to plutonium is used as an example.)

(1) The feed particles are reacted at temperatures up to 1700° in flowing nitrogen according to reaction "A" or "B" shown below. Nitrogen flow rates used in this stage are preferably equal to or greater than 40 cc./min./gm. (reactant). The reaction is continued until evolution of carbon monoxide ceases; the reaction takes about four to five hours and results in approximately 99.6% of the oxide being converted.

(A)

$$0.8UO_2 + 0.2PuO_2 + (2+x)C \xrightarrow[1500 \leq T \leq 1700°C.]{N_{2(g)}} (U_{0.8}Pu_{0.2})(N_{1-y}C_y) + zC + 2CO_{(g)} \quad (x=y+z)$$

or (B)

$$UO_2 + (2+x)C \xrightarrow[1500 \leq T \leq 1700°C.]{N_{2(g)}} U(N_{1-y}C_y) + zC + 2CO_{(g)}$$

or (B')

$$PuO_2 + (2+x)C \xrightarrow[1500 \leq T \leq 1700°C.]{N_{2(g)}} Pu(N_{1-y}C_y) + zC + 2CO_{(g)}$$

(2) Unreacted or excess carbon is removed from the carbonitride product by reducing the temperature to 1200° C. and flowing hydrogen through the bed at a rate of 80 cc./min./gm. (reactant). The reaction (C)

$$zC \xrightarrow[1000 \leq T \leq 1200°C.]{H_{2(g)}} zCH_{4(g)}$$

takes two to three hours and is continued until evolution of methane ceases.

(3) The chemically combined carbon is displaced from a carbonitride solid solution by reaction with nitrogen (at least 20 cc./min./gm.) at 1200° C. The brief reaction (1 to 2 hours) yields a higher uranium nitride plus free carbon.

(D)

$$(U_{0.8}Pu_{0.2})(N_{1-y}C_y) \xrightarrow[1000 \leq T \leq 1200°C.]{N_{2(g)}} (U_{0.8}Pu_{0.2})N_{>1.0} + yC$$

or (E)

$$U(N_{1-y}C_y) \xrightarrow[1000 \leq T \leq 1200°C.]{N_{2(g)}} UN_{>1.0} + yC$$

or (E')

$$Pu(N_{1-y}C_y) \xrightarrow[1000 \leq T \leq 1200°C.]{N_{2(g)}} PuN + yC$$

(Plutonium does not form the higher nitrides.)

(4) The displaced carbon is removed by an additional hydrogen reaction cycle similar to "2" above.

(F)

$$yC \xrightarrow[1000 \leq T \leq 1200°C.]{H_{2(g)}} yCH_{4(g)}$$

(5) The higher uranium nitrides formed in step "3" are decomposed by a brief outgas cycle at 1600° C. in flowing helium.

(G)

$$UN_{>1.0} \xrightarrow[T \geq 1500°C.]{He(g)} UN_{1.0}$$

or (H)

$$(U_{0.8}Pu_{0.2})N_{>1.0} \xrightarrow[T \geq 1500°C.]{He(g)} (U_{0.8}Pu_{0.2})N_{1.0}$$

The product of the five-step process is either single-phase uranium or plutonium nitride or solid solution uranium-plutonium nitride. The particles are low density, homogeneous and grey in color. The particle size is approximately that of the starting material.

A lower carbon content can be obtained by repeating steps 3 and 4 in sequence or by utilizing superatmospheric pressures in these steps. The process is normally carried out at atmospheric pressure, although higher pressures may be used if desired.

The composition of a "standard" mixed nitride of U/Pu ratio 4:1 is 5.30 wt. percent nitrogen, 0.20 wt. percent carbon, and 0.10 wt. percent oxygen. The reproducibility of this composition from batch to batch is within 0.10 wt. percent units, as indicated by the data for three successive runs given in Table I. Crystal lattice parameters for the primary phase in these compositions are also uniform to within 0.001 angstrom unit.

TABLE I.—COMPOSITION DATA FOR SEVERAL MIXED NITRIDES SYNTHESIED BY CARBOTHERMIC REDUCTION

| Run | UCN-2 | UPCN-4 | UPCN-6 | UPCN-7 |
|---|---|---|---|---|
| $N_2$ (wt. percent) | 4.84 | 5.22 | 5.20 | 5.30 |
| $O_2$ (wt. percent) | 0.04 | 0.10 | 0.08 | 0.18 |
| C (wt. percent) | 0.25 | 0.17 | 0.18 | 0.29 |
| U/Pu | (U only) | 4.0 | 4.0 | 4.2 |
| Lattice parameter (A.) | 4.890 | 4.893 | 4.893 | 4.893 |

Specific example—Run UPCN-6

This run was carried out as follows. Eighty grams $UO_2$, 20 grams of $PuO_2$ and 9 grams of carbon were weighed out and were mixed by screening three times through a 28-mesh screen. The mixture was then ball milled in a one-pint, rubber-lined ball mill, using alumina balls, for 23 hours at 60 r.p.m.

After ball milling, 88 drops of 10 wt. percent "Carbowax" (polyethylene glycol) in water was added to serve as a binder, and the mixture was passed five times through a 28-mesh screen which contained three alumina balls. It was then pressed into pellets using a ¾-inch-diameter die and a pressure of 3000 pounds.

The pellets were distintegrated by placing them on a 28-mesh screen containing the alumina balls under which a 60-mesh screen, a 100-mesh screen and a catch pan were positioned. The minus 28-plus 60 mesh material was taken as the product, the finer material being repressed and rescreened.

Fifty grams of the minus 28-plus 60 mesh granules was then loaded into the reactor shown in FIG. 1 and described above. The conditions employed are summarized in FIG. 2. (The hydrogen flow is somewhat higher than our preferred rate, given above, due to operator error.)

The characteristics of the material obtained are given above in Table I. Procedures used to characterize the material included X-ray (powder) diffraction, inert gas fusion analysis for oxygen and nitrogen, and combustion analysis for carbon using a gas mass spectrometer technique for determination of $CO_2$.

While we have described the process in detail as applied to the dioxides of uranium and plutonium, it may also be applied to the other oxides of these metals, e.g., $UO_3$, with suitable adjustment of the carbon content of the reaction mixture. While we have prepared the mixed uranium plutonium nitride from physical mixtures of uranium and plutonium oxides, the mixed oxides may also be employed. However, the physical mixture will usually be the more economical, and the fact that it may be utilized to produce the single-phase, mixed nitride is one of the advantages of our process.

The embodiments of the invention in which an exclusive property or privilege is claimed are defined as follows:

1. A method of producing a mononitride selected from the class consisting of UN, PuN and $U_xPu_yN$, where $x+y=1$, comprising the following series of steps:
   (a) preparing an intimate mixture of carbon with at least one oxide selected from the group consisting of oxides of uranium, oxides of plutonium and mixtures of oxides of uranium and oxides of plutonium;
   (b) passing nitrogen through said reaction mixture at a temperature in the range 1500° C. to 1700° C. until evolution of carbon monoxide ceases;
   (c) passing hydrogen through said reaction mixture at a temperature in the range 1000° C. to 1200° C. until the evolution of methane ceases;
   (d) passing nitrogen through said reaction mixture at a temperature in the range 1000° C. to 1200° C.;
   (e) passing hydrogen through said reaction mixture at a temperature in the range 1000° C. to 1200° C. through said reaction mixture until evolution of methane ceases; and
   (f) passing through said reaction mixture at a temperature of at least 1500° C. a gas which is inert at said temperature to all constituents of said reaction mixture and products formed by prior steps.

2. A process as defined in claim 1 wherein the oxide is a mixture of $UO_2$ in which the uranium is predominately $U^{238}$ and $PuO_2$ in which the plutonium is predominately $Pu^{239}$.

3. A method as defined in claim 1 wherein the ratio by weight of uranium oxide to plutonium oxide is in the range of substantially 10:1 to 1:1.

4. A method as defined in claim 3 wherein the ratio by weight of uranium oxide to plutonium oxide is substantially 4:1.

5. A method as defined in claim 1 wherein the oxide is a dioxide and the carbon forms from 8.6% to 10% by weight of the mixture.

6. A method as defined in claim 1 wherein the mixture is prepared by grinding together the oxide and carbon until a particle size of less than 25 microns is attained, pelleting the powder thus formed, and disintegrating the pellets in such a manner as to produce granules having the desired particle size, substantially each of which contains the mixed solid reactants.

7. A process as defined in claim 1 wherein said oxide is $UO_2$.

8. A process as defined in claim 1 wherein said oxide is $PuO_2$.

References Cited

UNITED STATES PATENTS 3,334,974  8/1967  Fletcher et al. _____ 23—347

CARL D. QUARFORTH, Primary Examiner

F. M. GITTES, Assistant Examiner

U.S. Cl. X.R.

23—344, 347